United States Patent
Shim et al.

(10) Patent No.: US 9,134,565 B2
(45) Date of Patent: Sep. 15, 2015

(54) PIXEL UNIT AND DISPLAY PANEL HAVING THE SAME

(75) Inventors: Woo-Sub Shim, Asan-si (KR);
Sung-Woong Kim, Suwon-si (KR);
Jang-Sub Kim, Suwon-si (KR);
Yoon-Ho Kang, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 167 days.

(21) Appl. No.: 13/408,805

(22) Filed: Feb. 29, 2012

(65) Prior Publication Data
US 2013/0016313 A1    Jan. 17, 2013

(30) Foreign Application Priority Data

Jul. 11, 2011 (KR) .......................... 10-2011-0068251

(51) Int. Cl.
*G02F 1/1335* (2006.01)
*G02B 5/22* (2006.01)

(52) U.S. Cl.
CPC ............ *G02F 1/133514* (2013.01); *G02B 5/22* (2013.01)

(58) Field of Classification Search
CPC combination set(s) only.
See application file for complete search history.

(56) References Cited

U.S. PATENT DOCUMENTS

| | | | |
|---|---|---|---|
| 7,643,114 B2* | 1/2010 | Lee et al. | 349/114 |
| 2004/0080684 A1* | 4/2004 | Rho | 349/106 |
| 2006/0017862 A1* | 1/2006 | Song et al. | 349/42 |
| 2006/0203155 A1* | 9/2006 | Nakamura et al. | 349/114 |
| 2008/0074590 A1* | 3/2008 | Jung | 349/109 |

* cited by examiner

*Primary Examiner* — Richard Kim
(74) *Attorney, Agent, or Firm* — H.C. Park & Associates, PLC (57) ABSTRACT

In a pixel unit and a display panel having the pixel unit, the pixel unit includes a pixel portion configured to display a color, and a transmissive portion configured to transmit light. The pixel portion is disposed at a central portion of the pixel unit and the transmissive portion is disposed at a peripheral portion adjacent to the central portion, or the transmissive portion is disposed at the central portion of the pixel unit and the pixel portion is disposed at the peripheral portion adjacent to the central portion.

15 Claims, 6 Drawing Sheets

PIXEL UNIT AND DISPLAY PANEL HAVING THE SAME

CROSS-REFERENCE TO RELATED APPLICATION

This application claims priority from and the benefit of Korean Patent Application No. 2011-0068251, filed on Jul. 11, 2011, which is hereby incorporated by reference for all purposes as if fully set forth herein.

BACKGROUND OF THE INVENTION

1. Field of the Invention

Exemplary embodiments of the present invention relate to a pixel unit and a display panel having the pixel unit, and, more particularly, to a pixel unit having a transparent portion and a display panel having the pixel unit.

2. Discussion of the Background

A liquid crystal display (LCD) apparatus is thin and light, so that the LCD apparatus is often used for a monitor, a laptop computer, a mobile phone, and etc. The LCD apparatus includes an LCD panel displaying an image using a light transmittance property, and a backlight unit disposed under the LCD panel. The backlight unit provides light to the LCD panel.

A transparent display apparatus which uses an ambient light source or an indirect light to display the image has been developed. The conventional display apparatus has an opaque back plate which cannot receive the light, but the transparent display apparatus is transparent for the ambient light to pass through the transparent display apparatus. Thus, the transparent display apparatus has the display panel through which the light passes and has a transparent structure.

Generally, there is a trade-off between the transmittance of the transparent display apparatus and the display quality (i.e. color reproducibility, a contrast ratio, a viewing angle, etc.). Thus, as the transmittance is improved by increasing the transparency, the color reproducibility may be decreased, and vice versa.

The transparent display apparatus transmits the ambient light from a backside of the transparent display apparatus, and displays the image using the ambient light when the display signal is turned on. Thus, the transmittance and the color reproducibility need to be guaranteed for the transparent display apparatus to display the high quality image as well as to maintain the high transmittance.

SUMMARY OF THE INVENTION

Exemplary embodiments of the present invention provide a pixel unit capable of improving both transmittance of light and display quality.

Exemplary embodiments of the present invention also provide a display panel having the pixel unit.

Additional features of the invention will be set forth in the description which follows, and in part will be apparent from the description, or may be learned by practice of the invention.

An exemplary embodiment of the present invention discloses a pixel unit including a pixel portion configured to display a color, and a transmissive portion configured to transmit light. The pixel portion is disposed at a central portion of the pixel unit and the transmissive portion is disposed at a peripheral portion adjacent to the central portion. Alternatively, the transmissive portion is disposed at the central portion of the pixel unit and the pixel portion is disposed at the peripheral portion adjacent to the central portion.

An exemplary embodiment of the present invention discloses a display panel including a first display substrate including a pixel unit having a pixel portion configured to display a color and a transmissive portion configured to transmit light, and a second display substrate configured to face the first substrate. The pixel portion is disposed at a central portion of the pixel unit and the transmissive portion is disposed at a peripheral portion adjacent to the central portion. Alternatively, the transmissive portion is disposed at the central portion of the pixel unit, and the pixel portion is disposed at the peripheral portion adjacent to the central portion.

An exemplary embodiment of the present invention discloses a color filter including a main pixel having at least one subpixel. The at least one subpixel includes a pixel portion disposed at a first region and a transmissive portion disposed at a second region adjacent to the first region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present.

Figure 1:
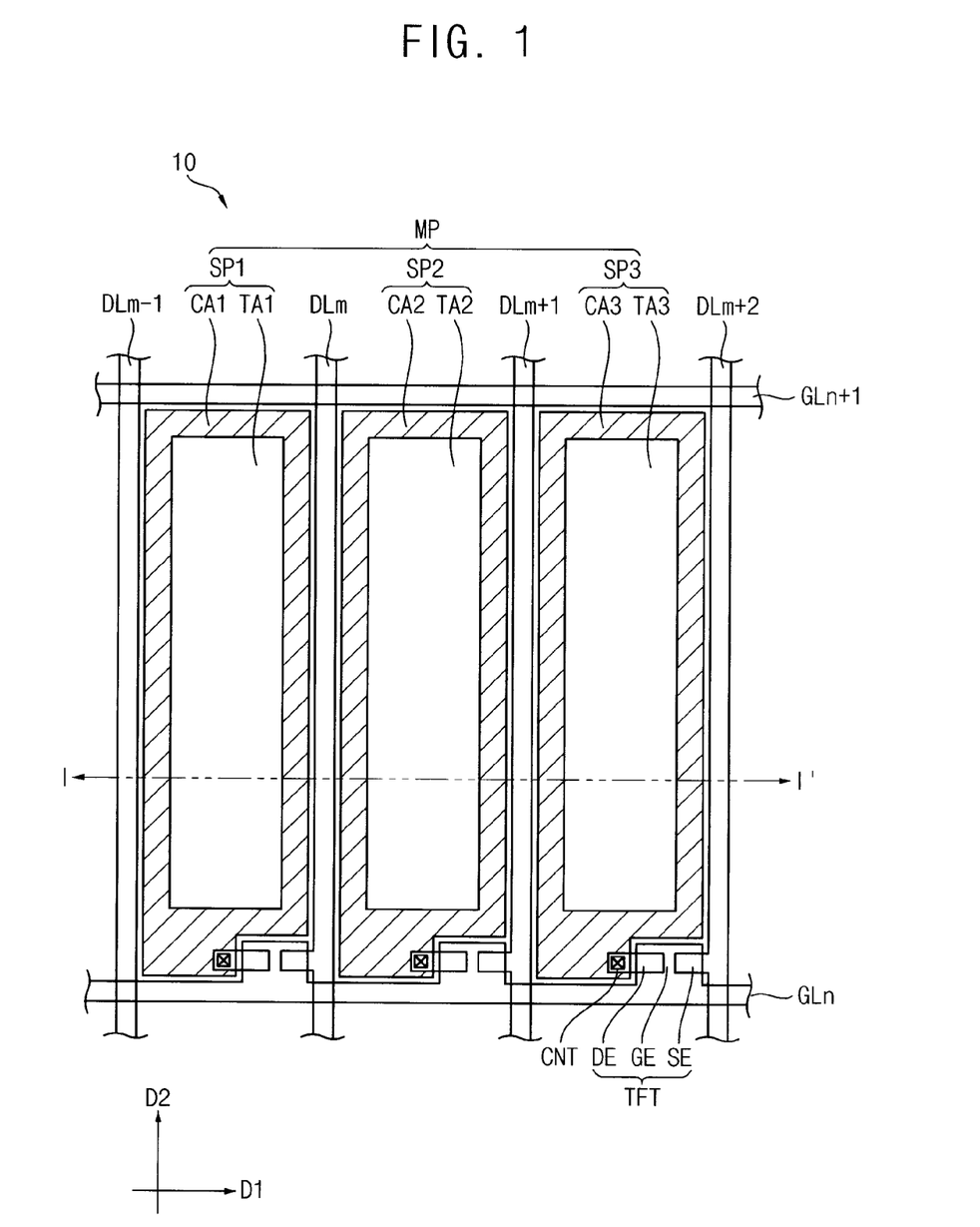
FIG. 1 is a plan view illustrating a display panel according to an exemplary embodiment of the present invention.
Figure 2:
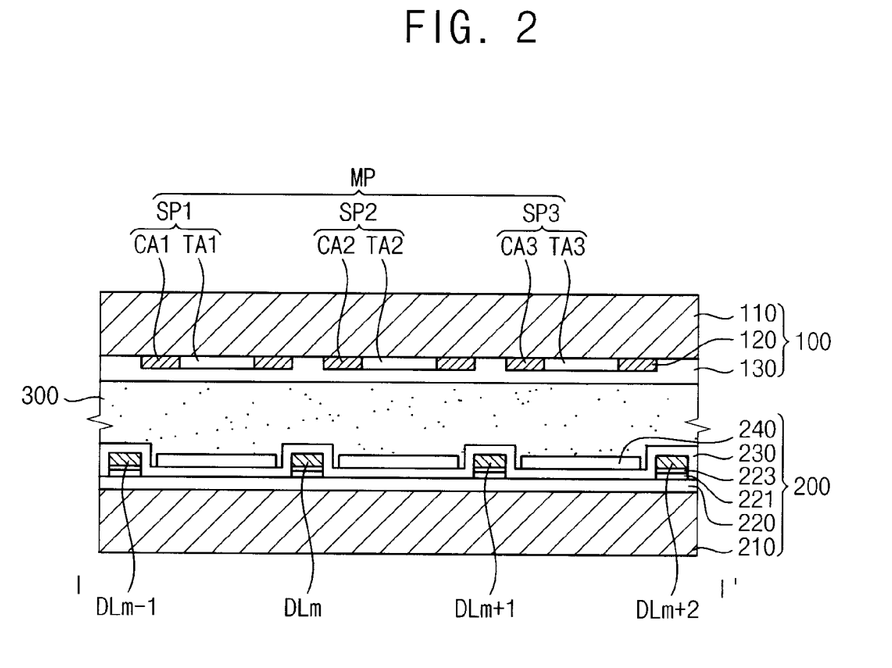
FIG. 2 is a cross-sectional view taken along the line I-I' of the display panel in FIG. 1 according to an exemplary embodiment of the invention.

FIG. 1 is a plan view illustrating a display panel according to an exemplary embodiment of the present invention. FIG. 2 is a cross-sectional view taken along the line I-I' of the display panel in FIG. 1 according to an exemplary embodiment of the invention.

Referring to FIG. 1 and FIG. 2, the display panel 10 includes a first display substrate 100, a second display substrate 200 facing the first display substrate 100, and a liquid crystal layer 300 disposed between the first display substrate 100 and the second display substrate 200.

The first display substrate 100 includes a first base substrate 110, a color filter 120, and a first electrode 130. The color filter 120 including a main pixel (MP) and the first electrode 130 are sequentially formed on the first base substrate 110. A surface of the first electrode 130 that faces the second substrate 200 may be planarized. Alternatively, although not shown in FIG. 2, the first electrode 130 may be formed on the color filter 120 with a uniform thickness.

The first display substrate 100 includes the color filter 120 including the main pixel MP having at least one subpixel (SP). The subpixel SP includes a pixel portion (CA) displaying a color and a transmissive portion (TA) transmitting light. The main pixel MP is formed in the color filter 120. An example of the main pixel MP is illustrated in FIG. 1, and FIG. 2, but the color filter 120 may include a plurality of main pixels MPs. A pixel portion is defined by a plurality of gate lines and a plurality of data lines crossing the gate lines in the main pixel.

The main pixel MP may include a first subpixel SP1, a second subpixel SP2 and a third subpixel SP3. For example, a pixel includes three subpixels. Thus, the main pixel MP includes the first subpixel SP1 displaying a red color, the second subpixel SP2 displaying a green color, and the third subpixel SP3 displaying a blue color. A subpixel may correspond to an electrode ("sub-electrode"). Although not shown in figures, the main pixel MP may further include a subpixel displaying a white color. The first, second, and third subpixels SP1, SP2 and SP3 may be spaced apart from each other by a predetermined distance. The number and colors is of subpixels, and distances between subpixels may be variously changed to satisfy different conditions.

Each of the first, second, and third subpixels SP1, SP2, and SP3 includes the pixel portion CA displaying a color and the transmissive portion TA transmitting light. The first subpixel SP1 includes a first transmissive portion TA1 and a first pixel portion CA1. The second subpixel SP2 includes a second transmissive portion TA2 and a second pixel portion CA2. The third subpixel SP3 includes a third transmissive portion TA3 and a third pixel portion CA3. Hereinafter, each of the first, second, and third subpixels SP1, SP2, and SP3, each of the first, second, and third pixel portions CA1, CA2, and CA3, and each of the first, second, and third transmissive portions TA1, TA2, and TA3 may be described as a subpixel SP, a pixel portion CA and a transmissive portion TA, respectively, in case of describing substantially common features.

Either the pixel portion CA or the transmissive portion TA is formed at a central portion of the subpixel SP, and the other is formed at a peripheral portion adjacent to the central portion. Thus, the pixel portion CA or the transmissive portion TA is selectively formed at the central portion. The transmissive portion TA may be formed at the peripheral portion if the pixel portion CA is formed at the central portion. The pixel portion CA may be formed at the central portion if the transmissive portion TA is formed at the peripheral portion. The pixel portion CA or the transmissive portion formed at the central portion may have various shapes in the subpixel SP.

The area of the transmissive portion TA may be in the range of about 90% to about 110% of the area of the pixel portion CA. The area of the transmissive portion TA may be in the range of about 40% to about 60% of the area of the subpixel SP. To improve transmittance and display quality of the display panel 10 at the same time, the area ratio between the transmissive portion TA and the pixel portion CA may be about 5:5. The color filter 120 may have a hole (or a hollow) for the transmissive portion TA. A transparent organic material or a transparent inorganic material having high transmittance may be filled in the hole for the transmissive portion TA.

The second display substrate 200 may include a second base substrate 210, a gate insulation film 220, a protecting film 230 and a second electrode 240. The gate insulation film 220, the protecting film 230 and the second electrode 240 are sequentially formed on the second base substrate 210.

In addition, the second display substrate 200 may further include gate lines GLn and GLn+1, data lines DLm−1, DLm, DLm+1 and DLm+2, and a thin film transistor (TFT). The data lines DLm−1, DLm, DLm+1 and DLm+2 are insulated from the gate lines GLn and GLn+1 by the insulation film 220 and cross the gate lines GLn and GLn+1. The thin film transistor TFT is a switching element electrically connected to one of the gate lines GLn and GLn+1 and one of the data lines DLm−1, DLm, DLm+1 and DLm+2. The gate lines GLn and GLn+1, the data lines DLm−1, DLm, DLm+1 and DLm+2 and the thin film transistor TFT are formed on the second display substrate 200. The protecting film 230 may be formed as a passivation layer, and it may cover the gate lines GLn and GLn+1, the data lines DLm−1, DLm, DLm+1 and DLm+2, and the thin film transistor TFT.

In addition, a semiconductor layer 221 and an ohmic contact layer 223 may be sequentially formed on the gate insulation film 220 to form the data lines DLm−1, DLm, DLm+1 and DLm+2.

The gate lines GLn and GLn+1 extend parallel to a first direction D1, and a second gate line GLn+1 is disposed at a first distance from a first gate line GLn in a second is direction D2 substantially perpendicular to the first direction D1. The data lines DLm−1, DLm, DLm+1 and DLm+2 extend parallel to the second direction D2, and are disposed along the first direction D1 with a second distance to divide the subpixels SP1, SP2 and SP3. For example, a first data line DLm is formed between the first subpixel SP1 and the second subpixel SP2 adjacent to each other, and a second data line DLm+1 is formed between the second subpixel SP2 and the third subpixel SP3 adjacent to each other.

The thin film transistor TFT may include a gate electrode GE, a channel layer (not shown) disposed on the gate electrode GE, and source and drain electrodes SE and DE disposed on the channel layer. For example, the gate electrode GE is electrically connected to the first gate line GLn, the source electrode SE is electrically connected to the second data line DLm+1, and the drain electrode DE is spaced apart from the source electrode SE. The semiconductor layer 221 and the ohmic contact layer 223 may be sequentially formed on the gate insulation film 220. The semiconductor layer 221 may form the channel layer.

The color filter 120 is formed in the first display substrate 100 in an exemplary embodiment, but the color filter 120 may be formed in the second display substrate 200. Further, the transmissive portion TA may be formed in the second display substrate 200.

The first base substrate 110 and the second base substrate 210 may include a glass material and/or a transparent plastic material to increase the transmittance.

In addition, the gate insulation film 220 and the protecting film 230 may include transparent organic material or transparent inorganic material.

The first electrode 130 and the second electrode 240 may include indium tin oxide (ITO) or graphene for high electro-conductivity and high transmittance. In addition, the gate lines GLn and GLn+1 and the data lines DLm−1, DLm, DLm+1 and DLm+2 may also include the ITO or the graphene.

The ITO is a transparent conductive film having the electro-conductivity and includes a compound of indium and tin oxide ($In_2O_3$, $SnO_2$). The ITO is usually formed via a sputtering process. The graphene is a carbon compound having a honeycomb structure in which carbon atoms are combined in a hexagonal shape. Electrons of the graphene may drift 100 times freer than that of silicon. The graphene is 100 times stronger than steel, and has a relatively high elasticity as an expanded area of the graphene may be enlarged as about 20% of the entire area. Even though being bent or stretched, the graphene maintains the electro-conductivity. Heat-conductivity of the graphene is 10 times higher than that of copper, and has relatively higher transmittance to transmit about 98% of light.

In addition, a liquid crystal layer 300 is disposed between the first display substrate 100 and the second display substrate 200.

The ambient light propagated into the backside of the display panel 10 passes through the first, second, and third transmissive portions TA1, TA2, and TA3. Thus, the display panel 10 transmits the ambient light from the backside of the display panel 10 like a glass window if a display signal is turned off, and displays an image using the ambient light if the display signal is turned on.

Accordingly, the subpixel includes the pixel portion displaying the color and the transmissive portion transmitting the light, thereby improving the transmittance and the display quality at the same time.

Figure 3:
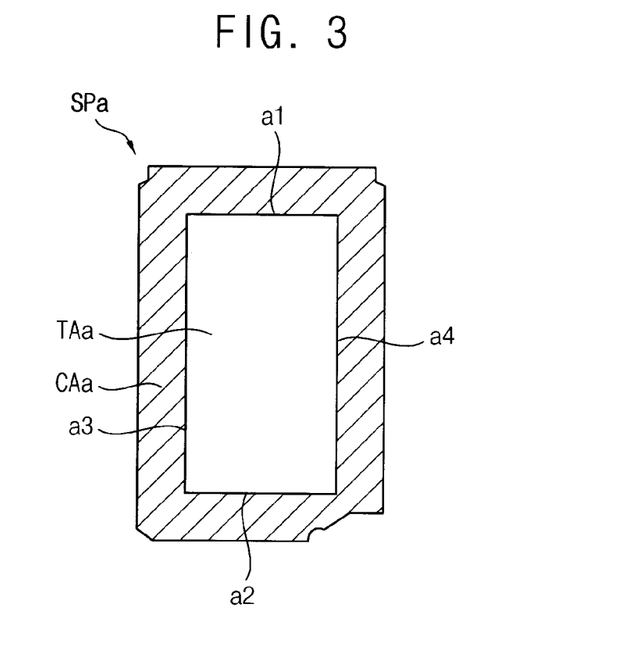
FIG. 3 is a plan view illustrating a subpixel of FIG. 1 according to an exemplary embodiment of the invention.

FIG. 3 is a plan view illustrating a subpixel of FIG. 1 according to an exemplary embodiment of the present invention.

Referring to FIG. 3, a subpixel SPa has a transmissive portion TAa formed at a central portion of the subpixel SPa in a rectangular shape. A pixel portion CAa is formed at a peripheral portion of the subpixel SPa, and surrounds the transmissive portion TAa. The transmissive portion TAa has a rectangular shape which has a first side a1, a second side a2 substantially parallel to the first side a1, a third side a3 and a fourth side a4 substantially parallel to the third side a3. The first and second sides a1 and a2 may be shorter than the third and fourth sides a3 and a4.

For example, the subpixel SPa may have the rectangular shape having a width of about 230 μm and a length of about 368 μm. A space having a width of about 16 μm may be formed for the thin film transistor TFT at a vertex of the subpixel SPa. The space may be a square-shaped hollow and each of the four sides of the square-shaped hollow may have a length of about 16 μm. A space having a faceted shape and having a width of about 8 μm may be formed at the rest of vertices of the subpixel Spa for accommodating the data lines and the gate lines overlapping with each other. The space having the faceted shape may be a square-shaped hollow and each of the four sides of the square-shaped hollow may have a length of about 8 μm. Each of the first and second sides a1 and a2 of the transmissive portion TAa disposed at the central portion of the subpixel SPa may have a length of about 170 μm. Each of the third and the fourth sides a3 and a4 may have a length of about 288 μm.

Figure 4:
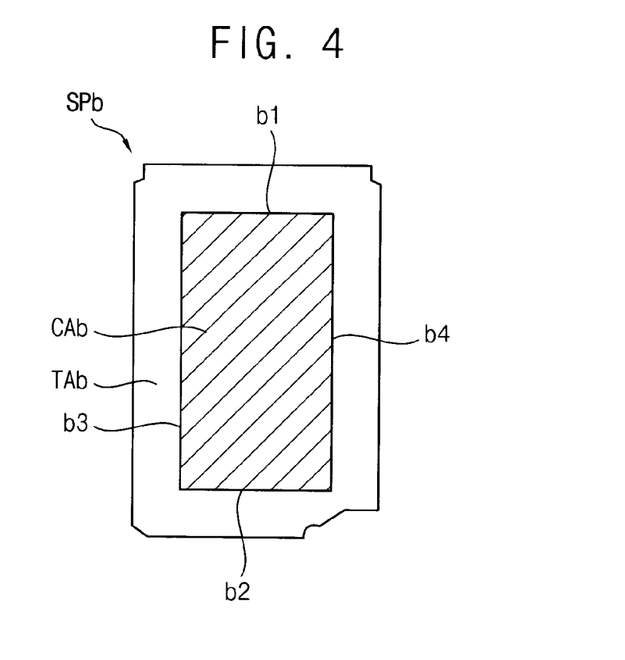
FIG. 4 is a plan view illustrating a subpixel according to another exemplary embodiment of the invention.

FIG. 4 is a plan view illustrating a subpixel according to another exemplary embodiment of the invention.

Although one subpixel SPb is illustrated in FIG. 4, as illustrated in FIG. 2, a main pixel may include a plurality of subpixels SPb and each of the subpixels SPb may display a single color.

Referring to FIG. 4, the subpixel SPb has a pixel portion CAb formed at a central portion of the subpixel SPb in a rectangular shape. A transmissive portion TAb is formed at a peripheral portion of the subpixel SPb, and surrounds the pixel portion CAb. The pixel portion CAb has the rectangular shape which has first and second sides b1 and b2 parallel to each other, and third and fourth sides b3 and b4 substantially parallel to each other. Each of the first and second sides b1 and b2 may be shorter than each of the third and fourth sides b3 and b4. For example, the shape of the subpixel SPb may be substantially the same as the subpixel SPa of FIG. 3. The outer shape of the subpixels in FIG. 5, FIG. 6, FIG. 7, FIG. 8, FIG. 9 and FIG. 10 may be substantially the same as that of the subpixel SPa of FIG. 3. Each of the first and second sides b1 and b2 of the pixel portion CAb disposed at the central portion of the subpixel SPb may have a length of about 170 μm. Each of the third and the fourth sides b3 and b4 may have a length of about 288 μm.

Figure 5:
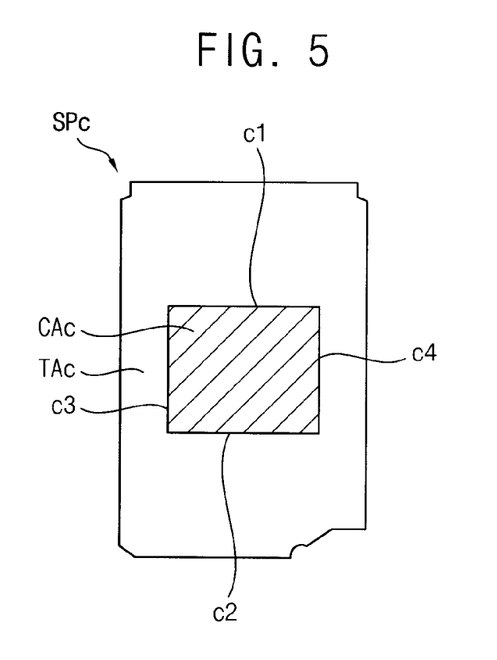
FIG. 5 is a plan view illustrating a subpixel according to still another exemplary embodiment of the invention.

FIG. 5 is a plan view illustrating a subpixel according to still another exemplary embodiment of the invention.

Although one subpixel SPc is illustrated in FIG. 5, as illustrated in FIG. 2, a main pixel may include a plurality of subpixels SPc and each of the subpixels SPc may display each own color.

Referring to FIG. 5, the subpixel SPc has a pixel portion CAc formed at a central portion of the subpixel SPc in a square shape. A transmissive portion TAc is formed at a peripheral portion of the subpixel SPc, and surrounds the pixel portion CAc. The pixel portion CAc has the square shape which has first and second sides c1 and c2 substantially parallel to each other, and third and fourth sides c3 and c4 substantially parallel to each other. Each of the first and second sides c1 and c2 may have a substantially the same length as that of each of the third and fourth sides c3 and c4. For example, each of the first, second, third, and fourth sides c1, c2, c3, and c4 may have a length of about 170 μm.

Figure 6:
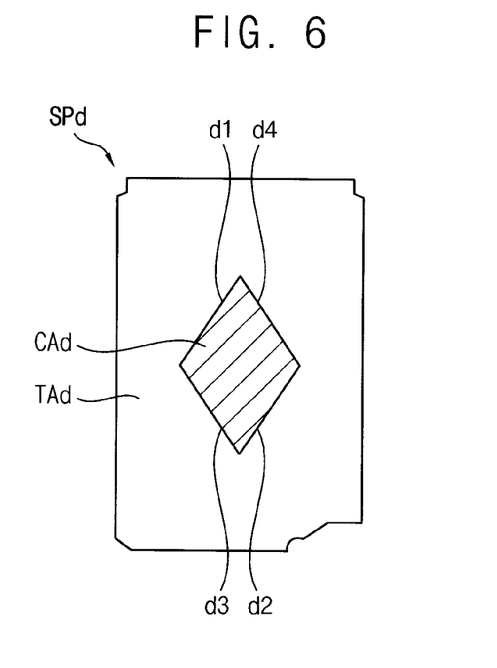
FIG. 6 is a plan view illustrating a subpixel according to still another exemplary embodiment of the invention.

FIG. 6 is a plan view illustrating a subpixel according to still another exemplary embodiment of the invention.

Although one subpixel SPd is illustrated in FIG. 6, as illustrated in FIG. 2, a main pixel may include a plurality of subpixels SPd and each of the subpixel SPd may display each own color.

Referring to FIG. 6, the subpixel SPd has a pixel portion CAd formed at a central portion of the subpixel SPd in a rhombic shape. A transmissive portion TAd is formed at a peripheral portion of the subpixel SPd, and surrounds the pixel portion CAd. The pixel portion CAd has the rhombic shape which has first and second sides d1 and d2 substantially parallel to each other, and a third and fourth sides d1 and d4 substantially parallel to each other. Each of the first and second sides d1 and d2 may have a substantially the same length as that of each of the third and fourth sides d3 and d4. For example, each of the first, second, third, and fourth sides d1, d2, d3, and d4 may have a length of about 140 μm.

Figure 7:
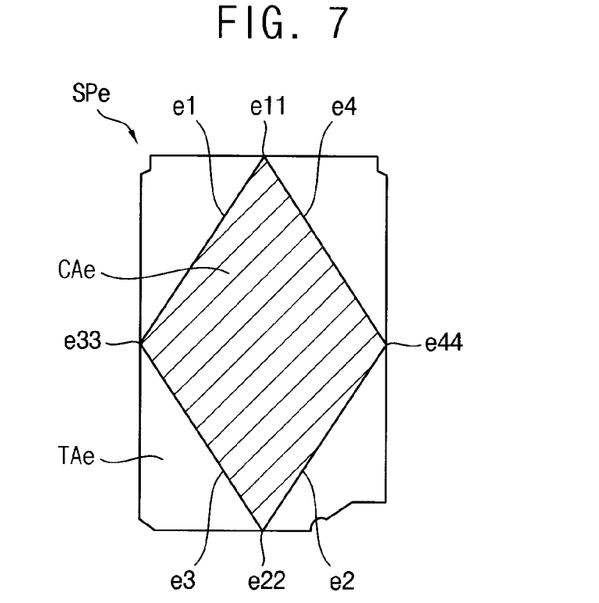
FIG. 7 is a plan view illustrating a subpixel according to still another exemplary embodiment of the invention.

FIG. 7 is a plan view illustrating a subpixel according to still another exemplary embodiment of the invention.

Although one subpixel SPe is illustrated in FIG. 7, as illustrated in FIG. 2, a main pixel may include a plurality of subpixels SPe and each of the subpixels SPe may display each own color.

Referring to FIG. 7, the subpixel SPe has a pixel portion CAe formed at a central portion of the subpixel SPe in a rhombic shape. A transmissive portion TAe is formed at a peripheral portion of the subpixel SPe, and surrounds the pixel portion CAe. Each of vertices e11, e22, e33 and e44 of the rhombic shape makes contact with each of sides of the subpixel SPe. The pixel portion CAe has the rhombic shape which has first and second sides e1 and e2 substantially parallel to each other, third and fourth sides e3 and e4 substantially parallel to each other. Each of the first and second sides e1 and e2 may have a substantially the same length as that of each of the third and fourth sides e3 and e4. For example, each of the first, second, third, and fourth sides e1, e2, e3, and e4 may have a length of about 143 μm.

Figure 8:
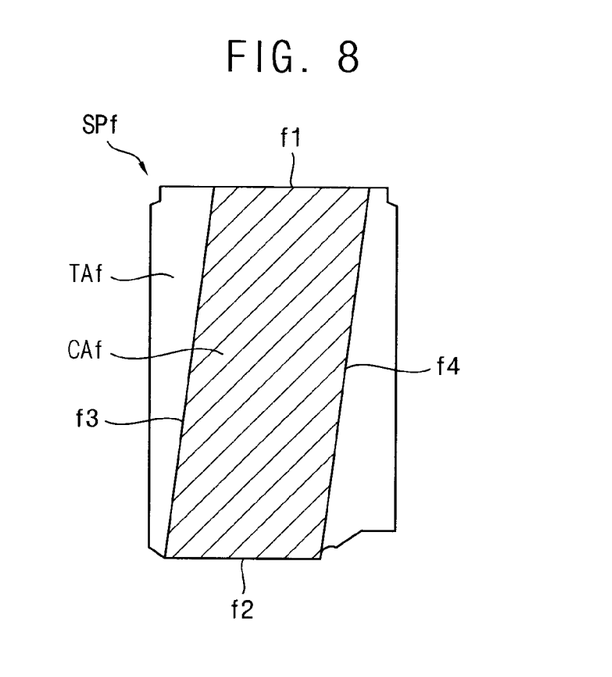
FIG. 8 is a plan view illustrating a subpixel according to still another exemplary embodiment of the invention.

FIG. 8 is a plan view illustrating a subpixel according to still another exemplary embodiment of the invention.

Although one subpixel SPf is illustrated in FIG. 8, as illustrated in FIG. 2, a main pixel may include a plurality of subpixels SPf and each of the subpixels SPf may display each own color.

Referring to FIG. 8, the subpixel SPf has a pixel portion CAf formed at a central portion of the subpixel SPf in a parallelogrammic shape. First and second sides f1 and f2 of the pixel portion CAf respectively overlap with first and second sides of the subpixel SPf. A transmissive portion TAf is formed at both sides of the pixel portion CAf. For example, each of the first and second sides f1 and f2 of the pixel portion CAf may have a length of about 170 μm. Each of the third and the fourth sides f3 and f4 may have a length of about 370 μm.

Figure 9:
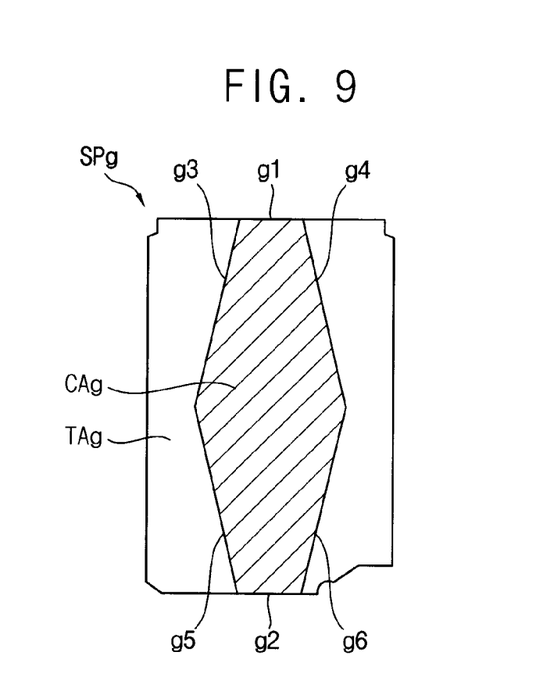
FIG. 9 is a plan view illustrating a subpixel according to still another exemplary embodiment of the invention.

FIG. 9 is a plan view illustrating a subpixel according to still another exemplary embodiment of the invention.

Although one subpixel SPg is illustrated in FIG. 9, as illustrated in FIG. 2, a main pixel may include a plurality of subpixels SPg and each of the subpixels SPg may display each own color.

Referring to FIG. 9, the subpixel SPg has a pixel portion CAg formed at a central portion of the subpixel SPg in a hexagonal shape. A central portion of the pixel portion CAg is wider than top and bottom portions of the pixel portion CAg. First and second sides g1 and g2 of the pixel portion CAg facing each other respectively overlap with first and second sides of the subpixel SPg. A transmissive portion TAg is formed at both sides of the pixel portion CAg. Each of third and fourth sides g3 and g4 may have a substantially the same length as that of each of fifth and sixth sides g5 and g6. For example, each of the first and second sides g1 and g2 of the pixel portion CAg may have a length of about 76.6 μm. Each of the third, fourth, fifth, and the sixth sides g3, g4, g5, and g6 may have a length of about 188 μm.

Figure 10:
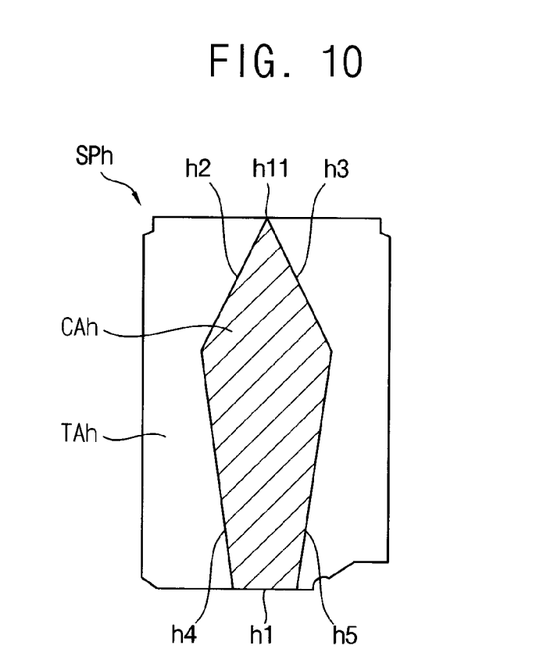
FIG. 10 is a plan view illustrating a subpixel according to still another exemplary embodiment of the invention.

FIG. 10 is a plan view illustrating a subpixel according to still another exemplary embodiment of the invention.

Although one subpixel SPh is illustrated in FIG. 10, as illustrated in FIG. 2, a main pixel may include a plurality of subpixels SPh and each of the subpixels SPh may display each own color.

Referring to FIG. 10, the subpixel SPh has a pixel portion CAh formed at a central portion of the subpixel SPh in a pentagonal shape. A central portion of the pixel portion CAh is wider than top and bottom portions of the pixel portion CAh. In addition, a first vertex h11 of the pentagonal shape makes contact with a first side of the subpixel SPh, and a first side h1 of the pixel portion CAh overlaps with a second side of the subpixel SPh. The transmissive portion TAh is formed at both sides of the pixel portion CAh. For example, the first side h1 of the pixel portion CAg may have a length of 76.6 μm. Each of second and third sides h2 and h3 may have a length of about 130 μm. Each of fourth and fifth sides h4 and h5 may have a length of about 246 μm.

As mentioned above, according to exemplary embodiments of the present inventions, a subpixel including a pixel portion displaying a color and a transmissive portion transmitting light are formed to improve transmittance and display quality at the same time.

According to exemplary embodiments of the present invention, a central portion of a pixel unit may have a polygonal shape, a circular shape, or an elliptical shape. A side of the central portion may refer to an edge of the central portion if the central portion has a polygonal shape. The shape of a peripheral portion of the pixel unit is not limited to a rectangular shape. A side of the peripheral portion may refer to an outer edge of the peripheral portion if the peripheral portion has a polygonal shape. A portion of the central portion may make contact with an outer edge of the peripheral portion.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display panel comprising:
    a first display substrate comprising a pixel unit having a pixel portion configured to display a color and a transmissive portion configured to transmit light and to not display the color;
    a second display substrate configured to face the first display substrate; and
    a liquid crystal layer disposed between the first display substrate and the second display substrate,
    wherein the pixel portion is disposed at a central portion of the pixel unit and the transmissive portion is disposed at a peripheral portion adjacent to the central portion, or the transmissive portion is disposed at the central portion of the pixel unit and the pixel portion is disposed at the peripheral portion adjacent to the central portion,
    wherein the peripheral portion surrounds the central portion,
    wherein the first display substrate further comprises a first base substrate and a first electrode,
    wherein the second display substrate comprises a second base substrate and a second electrode, the second electrode facing the pixel unit,
    wherein the first display substrate or the second display substrate comprises a thin film transistor, a data line, and a gate line,
    wherein the first and second electrodes overlap the pixel portion and the transmissive portion, and
    wherein a transmissive portion of the second electrode is configured to face the transmissive portion of the pixel unit such that light passing through the transmissive portion of the pixel unit and the first display substrate passes through the transmissive portion of the second electrode and the second display substrate without displaying the color.

2. The display panel of claim 1, wherein the peripheral portion comprises a first space to accommodate the thin film transistor and a second space to accommodate a portion of the data line or a portion of the gate line, and each of the first space and the second space is formed at a corner of the peripheral portion.

3. The display panel of claim 2, wherein the pixel unit comprises a connector at the first space to connect the pixel unit and the thin film transistor.

4. The display panel of claim 1, wherein one of the pixel portion and the transmissive portion in the central portion has a quadrilateral shape.

5. The display panel of claim 1, wherein one of the pixel portion and the transmissive portion in the central portion has a rhombic shape.

6. The display panel of claim 5, wherein the pixel portion has the rhombic shape, and at least one vertex of the pixel portion makes contact with a side of the pixel unit.

7. The display panel of claim 1, wherein one of the pixel portion and the transmissive portion in the central portion has a parallelogrammic shape.

8. The display panel of claim 7, wherein the pixel portion has the parallelogrammic shape, and at least one side of the pixel portion overlaps with a side of the pixel unit.

9. The display panel of claim 1, wherein the pixel portion has a polygonal shape, and at least one side of the pixel portion overlaps with a side of the pixel unit.

10. The display panel of claim 1, wherein the first display substrate comprises a color filter comprising a main pixel having the pixel unit, and the main pixel comprises multiple pixel units having a pixel portion and a transmissive portion.

11. The display panel of claim 1, wherein the color filter has a hole as the transmissive portion to accommodate a transmissive material.

12. The display panel of claim 1, wherein the area of the transmissive portion is in a range of about 90% to about 110% of the area of the pixel portion.

13. The display panel of claim 1, wherein
the first display substrate or the second display substrate comprises a protecting film, an ohmic contact layer, a semiconductor layer and a gate insulation film,
the gate line is perpendicular to the data line, and
the thin film transistor is connected to the data line, the gate line and the pixel unit.

14. The display panel of claim 1, wherein the first electrode, the second electrode, the data line, and the gate line comprise indium tin oxide (ITO) or graphene, so that light transmits the first electrode, the second electrode, the data line, and the gate line.

15. A display panel comprising:
a first display substrate comprising a pixel unit having a pixel portion configured to display a color and a transmissive portion configured to transmit light and to not display the color, the first display substrate further comprising a first electrode disposed on the pixel portion and the transmissive portion;
a second display substrate configured to face the first display substrate; and
a liquid crystal layer disposed between the first display substrate and the second display substrate,
wherein the pixel portion is disposed at a central portion of the pixel unit and the transmissive portion is disposed at a peripheral portion adjacent to the central portion, or the transmissive portion is disposed at the central portion of the pixel unit and the pixel portion is disposed at the peripheral portion adjacent to the central portion,
wherein the peripheral portion surrounds the central portion,
wherein the second display substrate comprises a second electrode, a transmissive portion of the second electrode facing the pixel portion and the transmissive portion of the pixel unit, and
wherein the transmissive portion of the second electrode is configured to face the transmissive portion of the pixel unit such that light passing through the transmissive portion of the pixel unit and the first display substrate passes through the transmissive portion of the second electrode and the second display substrate without displaying the color.

* * * * *